(12) United States Patent
Toho et al.

(10) Patent No.: US 12,535,103 B2
(45) Date of Patent: Jan. 27, 2026

(54) TAPERED ROLLER BEARING

(71) Applicant: NTN CORPORATION, Osaka (JP)

(72) Inventors: Shouta Toho, Kuwana (JP); Naoki Nakatochi, Kuwana (JP)

(73) Assignee: NTN CORPORATION, Osaka (JP)

(*) Notice: Subject to any disclaimer, the term of this patent is extended or adjusted under 35 U.S.C. 154(b) by 47 days.

(21) Appl. No.: 18/748,587

(22) Filed: Jun. 20, 2024

(65) Prior Publication Data
US 2024/0337287 A1    Oct. 10, 2024

Related U.S. Application Data

(63) Continuation of application No. PCT/JP2022/047338, filed on Dec. 22, 2022.

(30) Foreign Application Priority Data

Dec. 23, 2021  (JP) ................. 2021-209199

(51) Int. Cl.
  *F16C 19/36* (2006.01)
  *F16C 33/36* (2006.01)
  (Continued)

(52) U.S. Cl.
  CPC .......... *F16C 19/364* (2013.01); *F16C 33/366* (2013.01); *F16C 33/4605* (2013.01);
  (Continued)

(58) Field of Classification Search
  CPC .. F16C 19/364; F16C 33/366; F16C 33/4605; F16C 33/4629; F16C 33/4635;
  (Continued)

(56) References Cited

U.S. PATENT DOCUMENTS

| 1,909,617 A | 5/1933 | Hektner |
| 8,480,308 B2 | 7/2013 | Masuda et al. |

(Continued)

FOREIGN PATENT DOCUMENTS

| CN | 103410853 A | 11/2013 |
| CN | 203463492 U | 3/2014 |

(Continued)

*Primary Examiner* — Phillip A Johnson

(57) ABSTRACT

A tapered roller bearing of an inner ring guidance design. A smaller diameter annular part of a cage and a smaller rib of an inner ring of the bearing defines a smaller diameter-side clearance $S_1$. A larger diameter annular part of the cage and a larger rib of the inner ring defines a larger diameter-side clearance $S_2$. The bearing defines a dimensionless number Y which is in the range of at least 0.39 to no more than 0.88 according to the following equation: $Y=(S_{max}/S_3) \times (d/l)$ where d and l are a mean roller diameter and a roller length of the tapered rollers, respectively, $S_3$ corresponds to the equation: $S_3=(W/2)/\tan\theta-(PCD/2+(d/2)/\sin\theta-((D/2)^2-(W/2)^2)^{1/2})$, $S_{max}$ is chosen from the maximum values of $S_1$ and $S_2$, W is a pocket width of the cage, $\theta$ is a pillar angle which is a half of the angle formed, in a section corresponding to the mean roller diameter d, by surfaces of adjacent pillars of the cage that make contact with a tapered roller located in between, PCD is the diameter of roller centers representing the pitch circle diameter of the arrangement of the tapered rollers, and D is a cage inner diameter.

8 Claims, 9 Drawing Sheets

(51) Int. Cl.
*F16C 33/46* (2006.01)
*F16C 33/66* (2006.01)

(52) U.S. Cl.
CPC ...... *F16C 33/4629* (2013.01); *F16C 33/4635* (2013.01); *F16C 33/467* (2013.01); *F16C 33/6681* (2013.01); *F16C 2240/30* (2013.01); *F16C 2240/46* (2013.01); *F16C 2361/61* (2013.01)

(58) Field of Classification Search
CPC ............... F16C 33/467; F16C 33/6681; F16C 2240/30; F16C 2240/46; F16C 2361/61
See application file for complete search history.

(56) References Cited

U.S. PATENT DOCUMENTS

| | | | |
|---|---|---|---|
| 9,115,759 | B2 | 8/2015 | Kanda |
| 10,378,580 | B2 | 8/2019 | Hayashi et al. |
| 11,306,774 | B2 | 4/2022 | Zembutsu et al. |
| 2007/0041677 | A1 | 2/2007 | Masuda et al. |
| 2007/0177838 | A1 | 8/2007 | Tsujimoto |
| 2013/0336610 | A1 | 12/2013 | Kanda |
| 2017/0066372 | A1 | 3/2017 | Ruat et al. |
| 2018/0119735 | A1 | 5/2018 | Hayashi et al. |
| 2021/0054877 | A1 | 2/2021 | Zembutsu et al. |

FOREIGN PATENT DOCUMENTS

| | | | | |
|---|---|---|---|---|
| CN | 108087428 A | * | 5/2018 | .......... F16C 33/4635 |
| DE | 10 2015 219 706 A1 | | 4/2017 | |
| FR | 2548297 A1 | * | 1/1985 | .......... F16C 33/6681 |
| FR | 3 040 759 | | 3/2017 | |
| JP | 10-89353 | | 4/1998 | |
| JP | 2005-106234 A | | 4/2005 | |
| JP | 2007-51715 | | 3/2007 | |
| JP | 2008-69875 | | 3/2008 | |
| JP | 2008-261367 | | 10/2008 | |
| JP | 2009-41651 A | | 2/2009 | |
| JP | 2009-192069 | | 8/2009 | |
| JP | 2011-202714 A | | 10/2011 | |
| JP | 2017-8952 | | 1/2017 | |
| JP | 2017-214970 | | 12/2017 | |
| JP | 2018-44576 | | 3/2018 | |
| JP | 2018-109448 A | | 7/2018 | |
| JP | 2021-127774 A | | 9/2021 | |
| WO | WO 2013/011963 A1 | | 1/2013 | |
| WO | WO 2019/172446 A1 | | 9/2019 | |

\* cited by examiner

TAPERED ROLLER BEARING

CROSS REFERENCE TO THE RELATED APPLICATION

This application is a continuation application, under 35 U.S.C. § 111(a), of international application No. PCT/JP2022/047338, filed Dec. 22, 2022, which claims priority to Japanese patent application No. 2021-209199 filed Dec. 23, 2021, the entire disclosures of all of which are herein incorporated by reference as a part of this application.

BACKGROUND OF THE INVENTION

Field of the Invention

The present invention relates to a tapered roller bearing which can be applied to a part on which a centrifugal force acts, for example, a component of a planetary speed reducer in construction machinery and others, especially, planetary components in a first stage unit of the planetary speed reducer on which a significant centrifugal force acts.

Description of Related Art

A typical tapered roller bearing employs a rolling element guidance design in which a cage 5 is guided by tapered rollers 4, as shown in FIG. 11, for example. Yet, a bearing ring guidance (i.e., inner ring guidance or outer ring guidance) design is more preferred for those tapered roller bearings that are used in environments that involve orbital movement or revolving motion of components such as a planetary unit of a planetary speed reducer, since a cage of a rolling element guidance design would exhibit inadequate behavior stability as a result of the centrifugal force induced by the revolving motion and therefore suffer from considerable wear of pillars.

In regard to this, it is depicted in FIGS. 12A, 13A, 14A, and 15A how a tapered roller bearing operates with the use of a standard cage of a rolling element guidance design, while it is depicted in FIGS. 12B, 13B, 14B, and 15B how a tapered roller bearing operates with the use of a cage of an inner ring guidance design which is compatible with applications involving a high centrifugal force. Turning to FIGS. 13A and 13B each of which illustrates a tapered roller bearing applied to planetary revolving elements 105 of a planetary speed reducer, a centrifugal force G acts on the entire tapered roller bearing as the tapered roller bearing moves in a revolving manner that is indicated with an arrow c. Similarly, a centrifugal force G acts on the entire tapered roller bearing with a cage of an outer ring guidance design which is compatible with applications involving a high centrifugal force when it is applied to the planetary revolving elements.

Let us consider how the components of the tapered roller bearing interact with each other when the centrifugal force G induced by such a revolving motion acts on the entire bearing, assuming that an inner ring 2 of the tapered roller bearing is used as a stationary bearing ring and is thereby fixed in position. Turning to FIGS. 14A and 14B which show longitudinal sections of portions delimited by rectangles in FIGS. 13A and 13B, the centrifugal force G acts so as to pull cages 5 in a direction away from the axis of the revolving motion. In the case of the rolling element guidance design shown in FIG. 14A, the cage 5 will be pulled in a direction away from the axis of the revolving motion and displaced for a considerable distance in that direction due to the centrifugal force G, because of the large clearance S that exists between the cage 5 and ribs on the inner ring, especially, a smaller rib 2b. Thus, as illustrated in FIG. 15A showing an enlarged, cross section of the portion delimited by the rectangle in FIG. 13A, the gap S between tapered rollers 4 and the inner sides of the pockets present between the pillars 8 (surfaces of pillars 8, facing the tapered rollers 4) of the cage 5 closes, thereby causing additional wear to the inner sides of the pockets between the pillars 8.

In contrast, the clearances $S_1$, $S_2$ between the cage 5 of an inner ring guidance design and the inner ring ribs (i.e., a smaller rib 2b and a larger rib 2c) are short, as can be seen from FIG. 14B. Hence, even though the centrifugal force pulls the cage 5 in a direction away from the axis of the revolving motion, the displacement that the cage 5 makes in that direction is insubstantial. Thus, as illustrated in FIG. 15B showing an enlarged, cross section of the portion delimited by the rectangle in FIG. 13B, some gap 6 still remains between tapered rollers 4 and the inner sides of the pockets present between pillars 8, thereby causing little or no increase in the wear on the inner sides of the pockets between the pillars 8.

Some tapered roller bearings of an inner ring guidance design are provided with a flanged section on both of a smaller diameter side and a larger diameter side of a cage, such that the inner peripheral edge of the flanged section serves as a sliding surface by means of which the cage is guided by an inner ring (for example, Patent Document 1).

RELATED DOCUMENT

Patent Document

[Patent Document 1] Chinese Laid-open Patent Publication No. 103410853

SUMMARY OF THE INVENTION

A tapered roller bearing of an inner ring guidance design requires that the clearance between a cage and tapered rollers be larger than the clearance between the cage and an inner ring at all times in all of its pockets in order to ensure guidance by the inner ring. However, the prior art bearings including those discussed above do not provide any clear specifics of the relation among such clearances. For this reason, the clearance between the cage and the tapered rollers tends to be set to an excessively large value, which increases the chance of occurrence of skew of the tapered rollers (i.e., runout of the axes of rotation of the tapered rollers) during operation and puts the cage at risk of wear and more.

An object of the present invention is to provide a tapered roller bearing of an inner ring guidance design which can ensure guidance by an inner ring, limit the occurrence of skew of tapered rollers, and protect its cage against wear and more.

The present invention provides a tapered roller bearing of an inner ring guidance design which includes an inner ring having a raceway surface and having opposite ribs including a smaller rib and a larger rib, an outer member having an annular raceway surface in opposition to the raceway surface of the inner ring, a plurality of tapered rollers interposed between the inner ring and the outer member, and a cage retaining the plurality of tapered rollers. The cage includes a smaller diameter annular part, a larger diameter annular part, and pillars connecting the smaller diameter annular part and the larger diameter annular part at more than one circumferential location. The pillars are adjacent to each other to define, therebetween, pockets in which the tapered rollers are retained. The smaller diameter annular part and the smaller rib of the inner ring define a smaller diameter-side clearance $S_1$ therebetween. The larger diameter annular part and the larger rib of the inner ring define a larger diameter-side clearance $S_2$ therebetween. The tapered roller bearing defines a dimensionless number Y which is in the range of at least 0.39 to no more than 0.88 according to the following equation (1):

$$Y = (S_{max}/S_3) \times (d/l) \qquad (1)$$

where d is a mean roller diameter, l is a roller length, $S_3$ corresponds to the equation: $S_3=(W/2)/\tan\theta-(PCD/2+(d/2)/\sin\theta-((D/2)^2-(W/2)^2)^{1/2})$, $S_{max}$ is chosen from the maximum values of $S_1$ and $S_2$, W is a pocket width representing the width of a pocket at a location that corresponds to the mean roller diameter d, θ is a pillar angle which is a half of the angle formed, in a section corresponding to the mean roller diameter d, by surfaces of adjacent pillars that make contact with a tapered roller located in between, PCD is the diameter of roller centers representing the pitch circle diameter of the arrangement of the tapered rollers, and D is a cage inner diameter representing the inner diameter of the cage.

The clearance between the cage and the inner ring and the clearance between the cage and the tapered rollers in a tapered roller bearing according to the present invention are set to appropriate values that can ensure guidance by the inner ring, limit the occurrence of skew of the tapered rollers, and protect the cage against wear and more, by defining the smaller diameter-side clearance $S_1$, the larger diameter-side clearance $S_2$, the mean roller diameter d, the roller length l, the pocket width W, the pillar angle θ, the diameter PCD of roller centers, and the cage inner diameter D so that the dimensionless number Y is in the range of at least 0.39 to no more than 0.88 according to the abovementioned equation (1).

The smaller diameter annular part and the larger diameter annular part in a tapered roller bearing according to the present invention may include an arcuate-shaped corner section from the pillars and a flanged section extending radially inwards from the corner section.

The cage in a tapered roller bearing according to the present invention may comprise a press-formed or turned article.

A tapered roller bearing according to the present invention may define a dimensionless number X which is in the range of at least 0.69 to no more than 1.12 according to the following equation (2):

$$X = (1/\tan\alpha) \times (1 - (S_1/S_2) \times (d/l)) \qquad (2)$$

where $S_1$ is the smaller diameter-side clearance, $S_2$ is the larger diameter-side clearance, d is the mean roller diameter, l is the roller length, and α is an outer member angle which is an angle formed by two generatrix lines of a truncated cone defined by the raceway surface of the outer member in a section containing the axis of the truncated cone and has a value in the range of at least 20 degrees to no more than 40 degrees.

This additional feature can further protect the cage against wear by limiting whirling of the cage (i.e., runout of the axis of rotation of the cage) that may occur when the bearing is used in environments that involve a revolving motion of components.

The flanged section of the larger diameter annular part and the pillars in a tapered roller bearing according to the present invention may form a bending angle therebetween in the range of 90±10 degrees (or in the range of at least 80 degrees to no more than 100 degrees), as measured by using, as a reference angle, an angle of the cage defined by the pillars extending oblique to the axis of the bearing. The bending angle of the flanged section that is in the range of 90±10 degrees creates an appropriate geometry for a cage of an inner ring guidance design.

The corner section adjoining the flanged section in the larger diameter annular part of a tapered roller bearing according to the present invention may have an inner diameter surface with a radius of curvature, which is more than 20% and less than 90% of the length of the larger diameter annular part as measured in the direction of extension of the pillars. A large amount of stress can concentrate in the cage during a bending operation and may invite the risk of fracture, if the radius of curvature of the inner diameter surface of the corner section of the larger diameter annular part is equal to or less than 20% of the length of the larger diameter annular part as measured in the direction of extension of the pillars. If the radius of curvature of the inner diameter surface of the corner section of the larger diameter annular part is equal to or more than 90% of the length of the larger diameter annular part as measured in the direction of extension of the pillars, the arcuate curve of the inner diameter surface of the corner section may become too gentle, leading to a risk that edge loading may occur between the open edges of the pockets and the end faces of the tapered rollers. By defining the former to be more than 20% and less than 90% of the latter, such issues can be eliminated.

The flanged section in a tapered roller bearing according to the present invention may have an inner periphery which is provided, at more than one location, with a lubricant passage resembling a cutout and permitting a lubricant to pass through the flanged section inwards and outwards in the axial direction of the bearing. The provision of such a lubricant passage facilitates the movement of the lubricant into and out of the cage through the flanged section and can thereby achieve better lubrication among the tapered rollers, the raceway surfaces, and the inner sides of the pockets of the cage.

The ratio of the sectional area of the larger diameter annular part to the sectional area of the smaller diameter annular part in a tapered roller bearing according to the present invention as measured in a longitudinal section may be more than 1.0 and less than 1.2. By defining this sectional area ratio to be more than 1.0 and less than 1.2, an appropriate balance is achieved between the weight of the larger diameter side and the weight of the smaller diameter side of the cage, thereby limiting whirling of the cage and enabling better guidance by the inner ring.

Any combinations of at least two features disclosed in the claims and/or the specification and/or the drawings should also be construed as encompassed by the present invention. Especially, any combinations of two or more of the claims should also be construed as encompassed by the present invention.

BRIEF DESCRIPTION OF THE DRAWINGS

The present invention will be more clearly understood from the following description of preferred embodiments made by referring to the accompanying drawings. However, the embodiments and the drawings are given merely for the purpose of illustration and explanation, and should not be used to delimit the scope of the present invention, which scope is to be delimited by the appended claims. In the accompanying drawings, alike numerals are assigned to and indicate alike parts throughout the different figures, and:

DESCRIPTION OF EMBODIMENTS

A tapered roller bearing in accordance with an embodiment of the present invention will be described in connection with FIGS. 1 to 7. It should be noted that this tapered roller bearing 1 is applied to a planetary component of a planetary speed reducer or planetary transmission, as will be further discussed later in conjunction with FIGS. 8 and 9.

Figure 1:
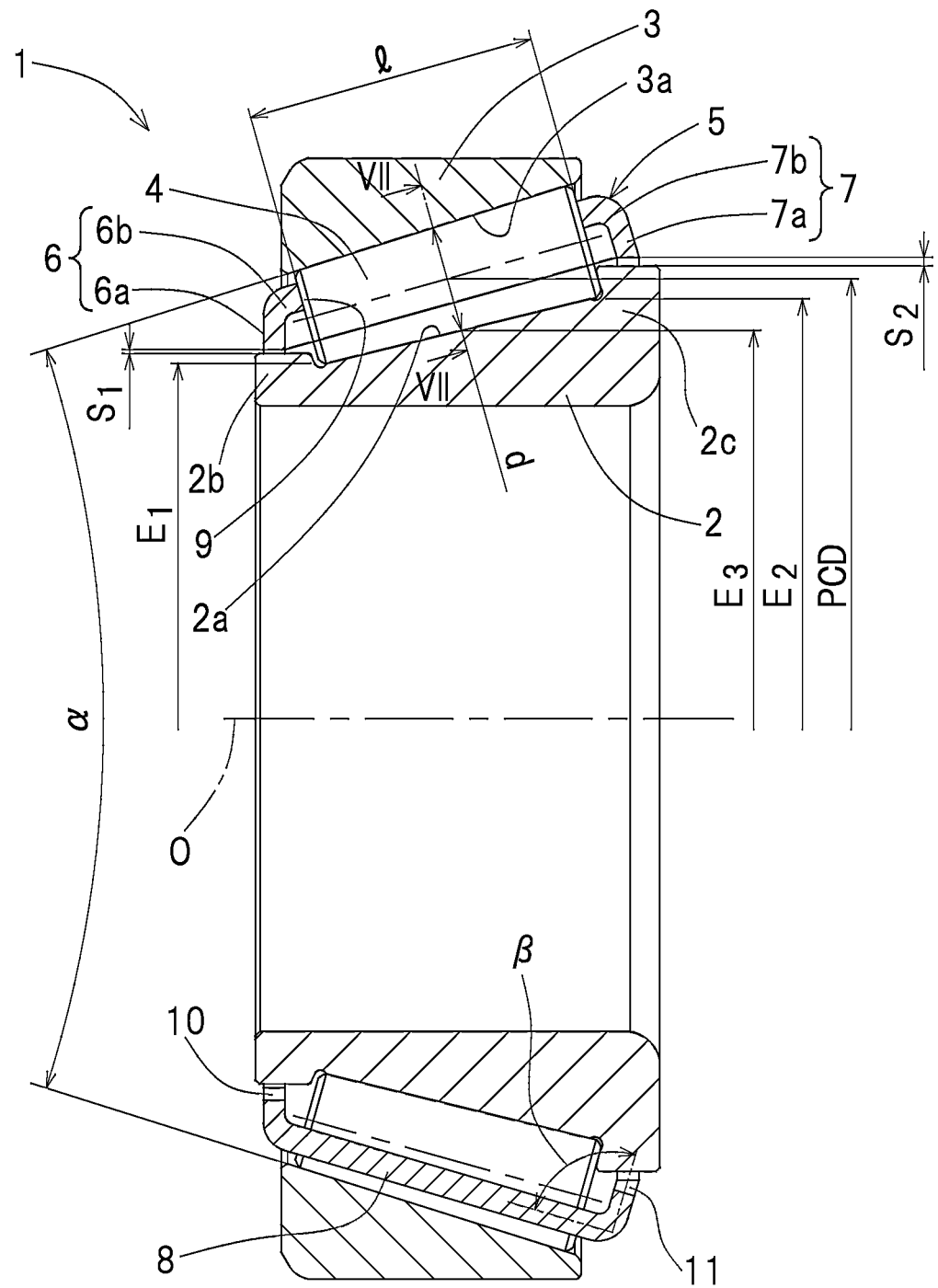
FIG. 1 shows a longitudinal section of a tapered roller bearing in accordance with an embodiment of the present invention.
Figure 2:
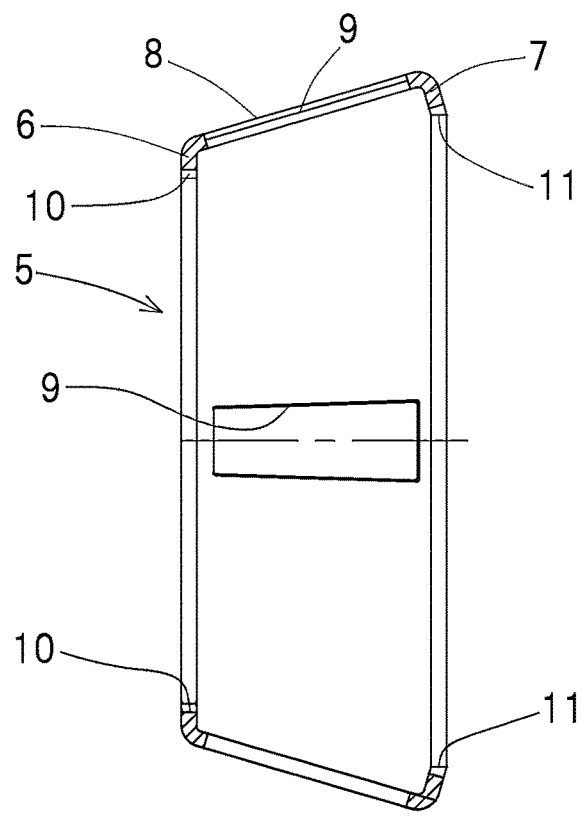
FIG. 2 shows a longitudinal section of a cage of the tapered roller bearing.

Turning to FIG. 1, the tapered roller bearing 1 includes an inner ring 2, an outer member 3, a plurality of tapered rollers 4 interposed between the inner ring 2 and the outer member 3, and a cage 5 retaining the plurality of tapered rollers 4. The inner ring 2 has a raceway surface 2a, which is in the form of a tapered surface extending with an increasing diameter from a point in the vicinity of one end to a point in the vicinity of the other end of the outer peripheral surface of the inner ring 2 in the axial direction of the bearing (which is a direction pointed along the axis O of the bearing and may be referred to in short as "axial direction"), and has opposite ribs including a smaller rib 2b and a larger rib 2c on the aforementioned one end and the other end, respectively. The outer member 3 comprises an annular component having a raceway surface 3a, which is in the form of a tapered surface extending with an increasing diameter from one end to the other end of the outer member 3 in opposition to the raceway surface 2a of the inner ring 2. Although the outer member 3 corresponds to a so-called "outer ring" when the outer member 3 plays no other role than that of a bearing component, the term "outer member" is used herein to define a concept that encompasses, for example, components with an outer peripheral surface that forms a geared section and an inner peripheral surface having the raceway surface 3a. It should be understood that the term "outer ring" may be used herein instead of the term "outer member" in some testing, analysis, and other examples. While the outer member 3 is shown with no ribs in the illustrated embodiments, the outer member 3 may have a rib (not shown) protruding radially inwards from either one of the one end or the other end of the outer member 3.

The cage 5 includes a smaller diameter annular part 6, a larger diameter annular part 7, and pillars 8 connecting the smaller diameter annular part 6 and the larger diameter annular part 7 at more than one circumferential location. The pillars 8 are adjacent to each other to define, therebetween, pockets 9 in which the tapered rollers 4 are retained. The smaller diameter annular part 6 and the larger diameter annular part 7 of the cage 5 have inner diameter sides with such a diameter that facilitates the guiding of the smaller diameter annular part 6 and the larger diameter annular part 7 by the smaller rib 2b and the larger rib 2c of the inner ring 2, respectively. Thus, the tapered roller bearing 1 employs an inner ring guidance design. It should be noted that the cage 5 can be any cage of an inner ring guidance design including that which is only guided by one of the smaller rib 2b and the larger rib 2c of the inner ring 2. Essentially, it is preferred that the cage 5 be guided at least by the smaller rib 2b of the inner ring 2.

Clearances $S_1$, $S_2$ between the cage 5 and the inner ring 2 and a clearance $S_3$ (FIG. 7) between the cage 5 and the tapered rollers 4 in the tapered roller bearing 1 are defined in the following way. Namely, the tapered roller bearing 1 defines a dimensionless number Y which is in the range of at least 0.39 to no more than 0.88 according to the following equation (1):

$$Y = (S_{max}/S_3) \times (d/l) \qquad (1)$$

where $S_1$ is a smaller diameter-side clearance which is a clearance between the smaller diameter annular part 6 of the cage 5 and the smaller rib 2b of the inner ring 2, $S_2$ is a larger diameter-side clearance which is a clearance between the larger diameter annular part 7 of the cage 5 and the larger rib 2c of the inner ring 2, d is a mean roller diameter for the tapered rollers 4, l is a roller length for the tapered rollers 4, $S_3$ corresponds to the equation: $S_3 = (W/2)/\tan\theta - (PCD/2 + (d/2)/\sin\theta - ((D/2)^2 - (W/2)^2)^{1/2})$, $S_{max}$ is chosen from the maximum values of $S_1$ and $S_2$, W is a pocket width (FIG. 7) representing the width of a pocket 9 at a location that corresponds to the mean roller diameter d, θ is a pillar angle which is a half of the angle formed, in a section corresponding to the mean roller diameter d, by surfaces of adjacent pillars 8 that make contact with a tapered roller 4 located in between, PCD is the diameter of roller centers representing the pitch circle diameter of the arrangement of the tapered rollers 4, and D is a cage inner diameter representing the inner diameter of the cage 5. It should be noted that the subscript "1" is associated with the smaller diameter side, while the subscript "2" is associated with the larger diameter side, as can be seen from FIG. 1.

Such a numerical limitation of the dimensionless number Y has been derived from the following considerations. A tapered roller bearing 1 having an inner ring guidance design requires that the clearance $S_3$ between a cage 5 and tapered rollers 4 be larger than the clearances $S_1$, $S_2$ between the cage 5 and an inner ring 2 at all times in all of its pockets 9 in order to ensure guidance by the inner ring. However, if the clearance $S_3$ between the cage 5 and the tapered rollers 4 is excessively large, the chance of occurrence of skew of the tapered rollers 4 (i.e., runout of the axes of rotation of the tapered rollers 4) during operation increases, putting the cage 5 at risk of wear and more.

Therefore, the dimensionless number Y introduced above has been proposed for use as a parameter that assesses the appropriateness of the clearances $S_1$, $S_2$ between the cage 5 and the inner ring 2 and the clearance $S_3$ between the cage 5 and the tapered rollers 4. Then, endurance tests simulating a speed reducer have been carried out on five samples No. (A) to (E) of a tapered roller bearing with different values of the dimensionless number Y. As can be seen from Table 1, favorable results were obtained for those with the dimensionless number Y in the range of at least 0.39 to no more than 0.88. Hence, this range has been associated with appropriate values for the clearances $S_1$, $S_2$ between the cage 5 and the inner ring 2 and the clearance $S_3$ between the cage 5 and the tapered rollers 4.

TABLE 1

| Sample No. | (A) | (B) | (C) | (D) | (E) |
| --- | --- | --- | --- | --- | --- |
| Y | 0.39 | 0.41 | 0.62 | 0.88 | 1.15 |
| Cage Condition | Good | Good | Good | Fair | Bad |

Good: No Wear,
Fair: Slightly Worn (Still Usable),
Bad: Severely Worn (No Longer Usable)

Thus, the clearances $S_1$, $S_2$ between the cage 5 and the inner ring 2 and the clearance $S_3$ between the cage 5 and the tapered rollers 4 can be set to appropriate values that can ensure guidance by the inner ring, limit the occurrence of skew of the tapered rollers 4, and protect the cage 5 against wear and more, by defining the smaller diameter-side clearance $S_1$, the larger diameter-side clearance $S_2$, the mean roller diameter d, the roller length l, the pocket width W, the pillar angle θ, the diameter PCD of roller centers, and the cage inner diameter D so that the dimensionless number Y is in the range of at least 0.39 to no more than 0.88 according to the abovementioned equation (1). It should be understood that the diameter PCD of roller centers can be calculated using an inner ring raceway diameter $E_3$, the mean roller diameter d, and an outer member angle α, which will be discussed later, according to the equation: $PCD = E_3/2 + (d/2) \times \cos(\alpha/2)$, as can be seen from FIG. 1. The inner ring raceway diameter $E_3$ can be calculated using a smaller rib-side inner ring raceway diameter $E_1$ and a larger rib-side inner ring raceway diameter $E_2$ according to the equation: $E_3 = (E_1 + E_2)/2$.

Further, the smaller diameter annular part 6 and the larger diameter annular part 7 of the cage 5 of the tapered roller bearing 1 include arcuate-shaped corner sections 6b, 7b from the pillars 8 and flanged sections 6a, 7a extending radially inwards from the corner sections 6b, 7b. In the instant embodiment, the cage 5 comprises a press-formed article produced from a metal sheet such as an iron metal sheet. The smaller diameter annular part 6 and the larger diameter annular part 7 are formed by a bending step, while the pillars 8 are formed by punching off material to create the pockets 9 during the press working. Alternatively, the cage 5 may be produced from metal by a turning operation or may comprise a plastic molded article.

In addition, the tapered roller bearing 1 defines a dimensionless number X which is in the range of at least 0.69 to no more than 1.12 according to the following equation (2):

$$X = (1/\tan\alpha) \times \left(1 - (S_1/S_2) \times (d/l)\right) \qquad (2)$$

where $S_1$ is the smaller diameter-side clearance, $S_2$ is the larger diameter-side clearance, d is the mean roller diameter, l is the roller length, and α is the outer member angle which is an angle formed by two generatrix lines of a truncated cone defined by the raceway surface 3a of the outer member 3 in a section containing the axis of the truncated cone. Note that the outer member angle α should have a value in the range of at least 20 degrees to no more than 40 degrees in order to realize an appropriate load bearing capacity for both the axial load and the radial load.

Such a numerical limitation of the dimensionless number X has been derived from the following considerations. As discussed earlier, a centrifugal force G acts on a tapered roller bearing 1 of an inner ring guidance design when it is used in environments that involve orbital movement or revolving motion. In that case, it is necessary to limit whirling of a cage 5 (i.e., runout of the axis of rotation of the cage 5) by controlling not only the clearances $S_1$, $S_2$ (i.e., a smaller diameter-side clearance $S_1$ and a larger diameter-side clearance $S_2$) between the cage 5 and an inner ring 2 as measured when not in operation, but also the clearance (i.e., radial and axial clearances governed by a mean roller diameter d and a roller length l) between the cage 5 and tapered rollers 4 as measured during operation.

Therefore, the dimensionless number X introduced above has been proposed for use as a parameter that assesses the appropriateness of the clearances $S_1$, $S_2$ between the cage 5 and the inner ring 2 as measured when not in operation and the clearance between the cage 5 and the tapered rollers 4 as measured during operation. Then, endurance tests simulating a speed reducer have been carried out on eight samples No. (1) to (8) of a tapered roller bearing with different values of the dimensionless number X. As can be seen from Table 2, favorable results were obtained for those with the dimensionless number X in the range of at least 0.69 to no more than 1.12. Hence, this range has been associated with appropriate values for the clearances $S_1$, $S_2$ between the cage 5 and the inner ring 2 as measured when not in operation and the clearance between the cage 5 and the tapered rollers 4 as measured during operation.

TABLE 2

| Sample No. | (1) | (2) | (3) | (4) | (5) | (6) | (7) | (8) |
|---|---|---|---|---|---|---|---|---|
| X | 0.64 | 0.69 | 0.73 | 0.91 | 1.06 | 1.12 | 1.17 | 1.23 |
| Cage Condition | Bad | Fair | Good | Good | Fair | Fair | Bad | Bad |

Good: No Wear,
Fair: Slightly Worn (Still Usable),
Bad: Severely Worn (No Longer Usable)

Thus, the clearances $S_1$, $S_2$ between the cage 5 and the inner ring 2 as measured when not in operation and the clearance between the cage 5 and the tapered rollers 4 as measured during operation can be set to appropriate values that can limit whirling of the cage 5 to further protect the cage 5 against wear and others, by defining the smaller diameter-side clearance $S_1$, the larger diameter-side clearance $S_2$, the mean roller diameter d, the roller length l, and the outer member angle α so that the dimensionless number X is in the range of at least 0.69 to no more than 1.12 according to the abovementioned equation (2).

Also, the flanged section 7a of the larger diameter annular part 7 and the pillars 8 in the tapered roller bearing 1 form a bending angle β therebetween in the range of 90±10 degrees (or in the range of at least 80 degrees to no more than 100 degrees), as measured by using, as a reference angle, an angle of the cage defined by the pillars 8 extending oblique to the axis O of the bearing. The bending angle β of the flanged section 7a that is in the range of 90±10 degrees creates an appropriate geometry for a cage 5 of an inner ring guidance design. The inner diameter sides of the smaller diameter annular part 6 and the larger diameter annular part 7 are preferably parallel to the outer peripheral sides of the smaller rib 2b and the larger rib 2c of the inner ring 2, respectively, but may alternatively be angled to the latter instead.

Figure 4:
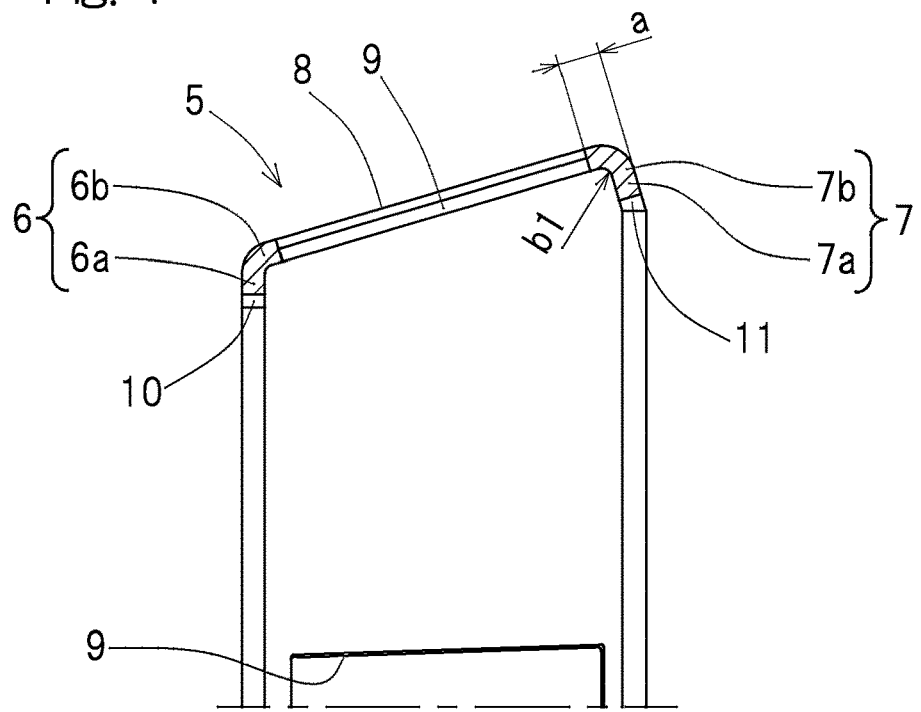
FIG. 4 shows a partially enlarged, longitudinal section of the cage.
Figure 5:
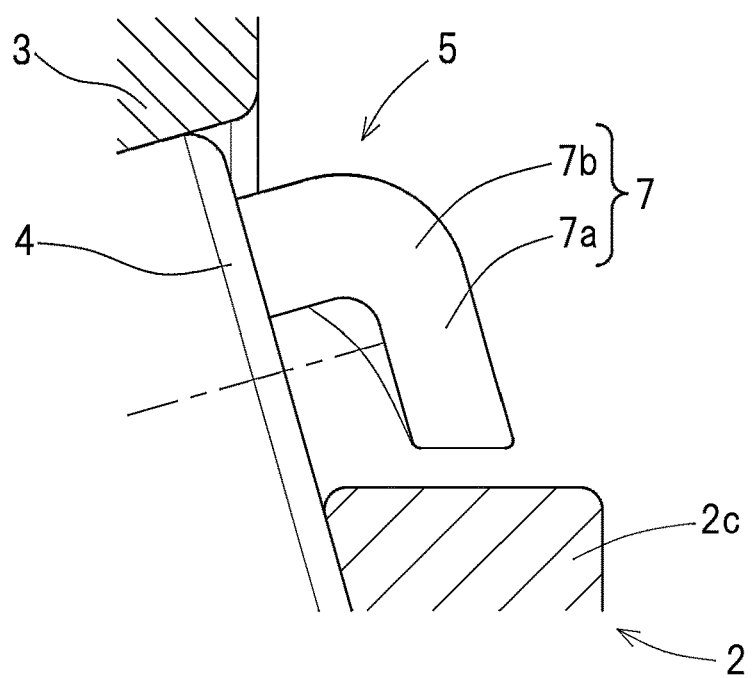
FIG. 5 shows a partially enlarged, longitudinal section which illustrates a larger diameter annular part of the cage and a tapered roller on a further enlarged scale.
Figure 6:
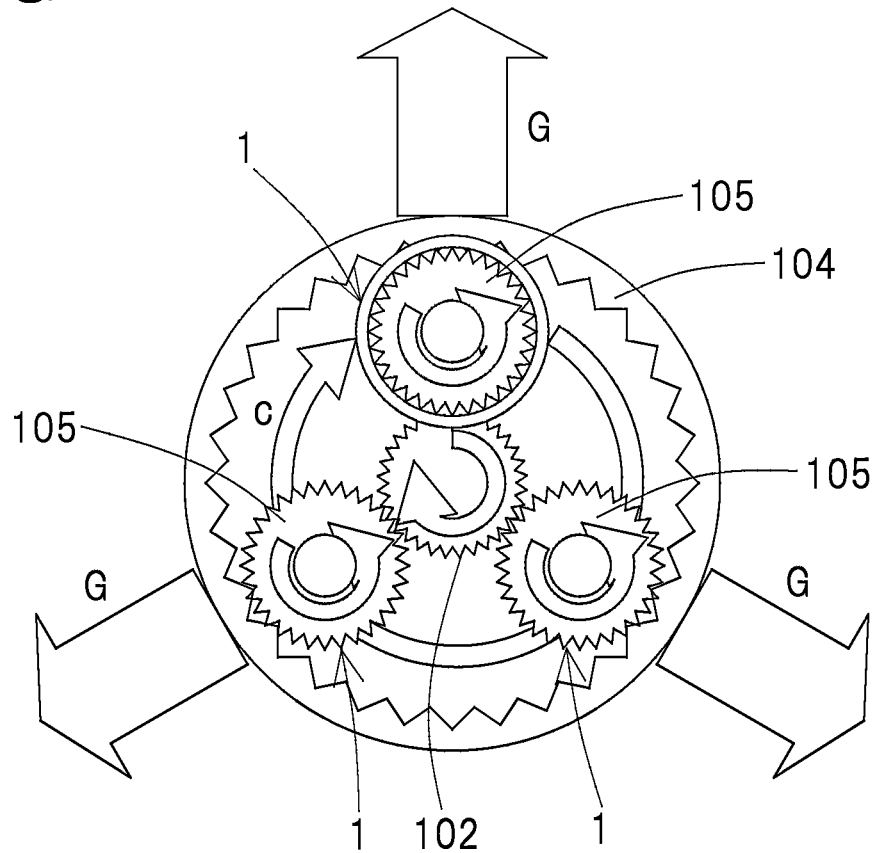
FIG. 6 shows a diagram that illustrates how a centrifugal force acts on the tapered roller bearing when it is used in a planetary speed reducer.
Figure 7:
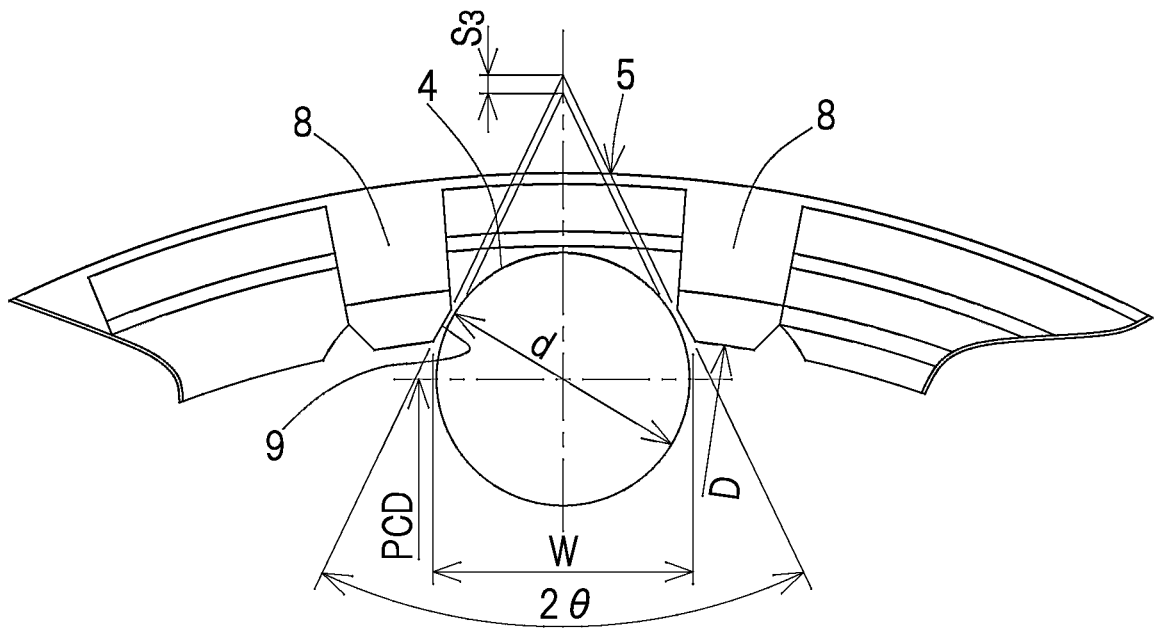
FIG. 7 shows a section taking along the line VII-VII in FIG. 1, illustrating a pillar angle and other parameters of the tapered roller bearing.

Further, turning to FIG. 4, the corner section 7b adjoining the flanged section 7a in the larger diameter annular part 7 of the tapered roller bearing 1 has an inner diameter surface with a radius b1 of curvature, which is more than 20% and less than 90% of the length a of the larger diameter annular part 7 as measured in the direction of extension of the pillars 8. A large amount of stress can concentrate in the cage 5 during a bending operation and may invite the risk of fracture, if the radius b1 of curvature of the inner diameter surface of the corner section 7b of the larger diameter annular part 7 is equal to or less than 20% of the length a of the larger diameter annular part 7b as measured in the direction of extension of the pillars 5. If the radius b1 of curvature of the inner diameter surface of the corner section 7b of the larger diameter annular part 7 is equal to or more than 90% of the length a of the larger diameter annular part 7b as measured in the direction of extension of the pillars 5, the arcuate curve of the inner diameter surface of the corner section 7b may become too gentle as indicated with a thin line in FIG. 5, leading to a risk that edge loading may occur between the open edges of the pockets 9 and the end faces of the tapered rollers 4. By defining the former to be more than 20% and less than 90% of the latter, such issues can be eliminated.

Figure 3A:
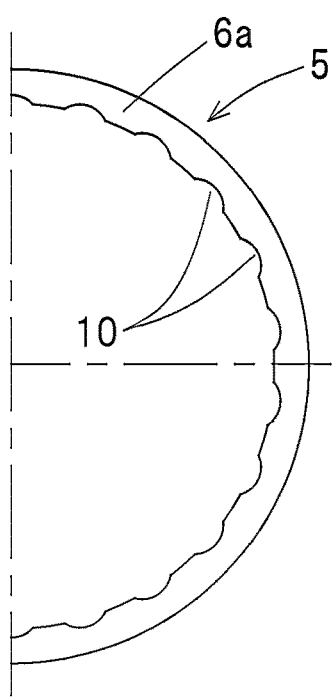
FIG. 3A shows an end view of a smaller diameter-side end of the cage.
Figure 3B:
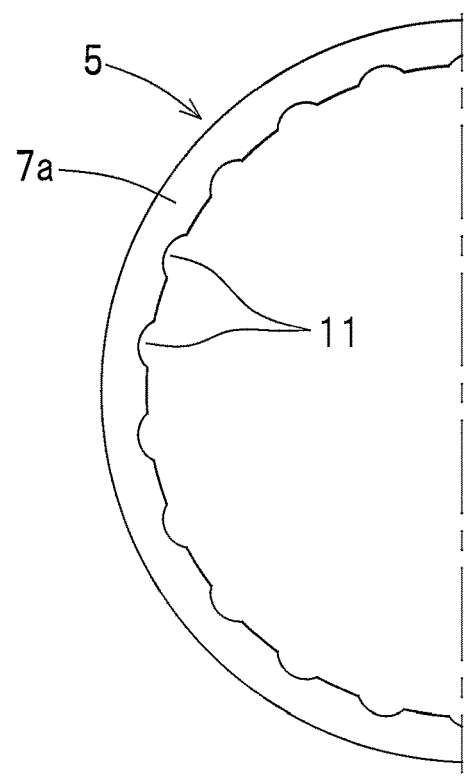
FIG. 3B shows an end view of a larger diameter-side end of the cage.

Furthermore, turning to FIGS. 3A and 3B, the flanged sections 6a, 7a in the tapered roller bearing 1 have an inner periphery which includes, at more than one location, a lubricant passage 10, 11 resembling a cutout and permitting a lubricant to pass through the flanged sections 6a, 7a inwards and outwards in the axial direction of the bearing. While the lubricant passage 10, 11 resembling a cutout has an arcuate shape in the instant embodiment, it may alternatively have an elliptically arcuate shape and/or other shapes. Alternatively, only one of the smaller diameter annular part 6 and the larger diameter annular part 7 may include such a flanged section. The provision of the lubricant passage 10, 11 facilitates the movement of the lubricant into and out of the cage 5 through the flanged sections 6a, 7a and can thereby achieve better lubrication among the tapered rollers 4, the raceway surfaces 2a, 3a, and the inner sides of the pockets of the cage. Nevertheless, it is not necessarily mandatory to provide the lubricant passage 10, 11.

In addition, as can be seen from the upper side of FIG. 1, the ratio of the sectional area of the larger diameter annular part 7 to the sectional area of the smaller diameter annular part 6 in the tapered roller bearing 1 as measured in a longitudinal section is more than 1.0 and less than 1.2. By defining this sectional area ratio to be more than 1.0 and less than 1.2, an appropriate balance is achieved between the weight of the larger diameter side and the weight of the smaller diameter side of the cage 5, thereby limiting whirling of the cage 5 and enabling better guidance by the inner ring. It should be noted that, if the flanged sections 6a, 7a of the smaller diameter annular part 6 and the larger diameter annular part 7 are provided with the lubricant passage 10, 11 resembling a cutout as with the tapered roller bearing 1 of the instant embodiment, the abovementioned sectional area of the smaller diameter annular part 6 in a longitudinal section corresponds to the sectional area of the smaller diameter annular part 6 in a longitudinal section which does not contain the lubricant passage 10 (or the maximum sectional area of the smaller diameter annular part 6 in a longitudinal section), and the abovementioned sectional area of the larger diameter annular part 7 in a longitudinal section corresponds to the sectional area of the larger diameter annular part 7 in a longitudinal section which does not contain the lubricant passage 11 (or the maximum sectional area of the larger diameter annular part 7 in a longitudinal section).

Figure 8:
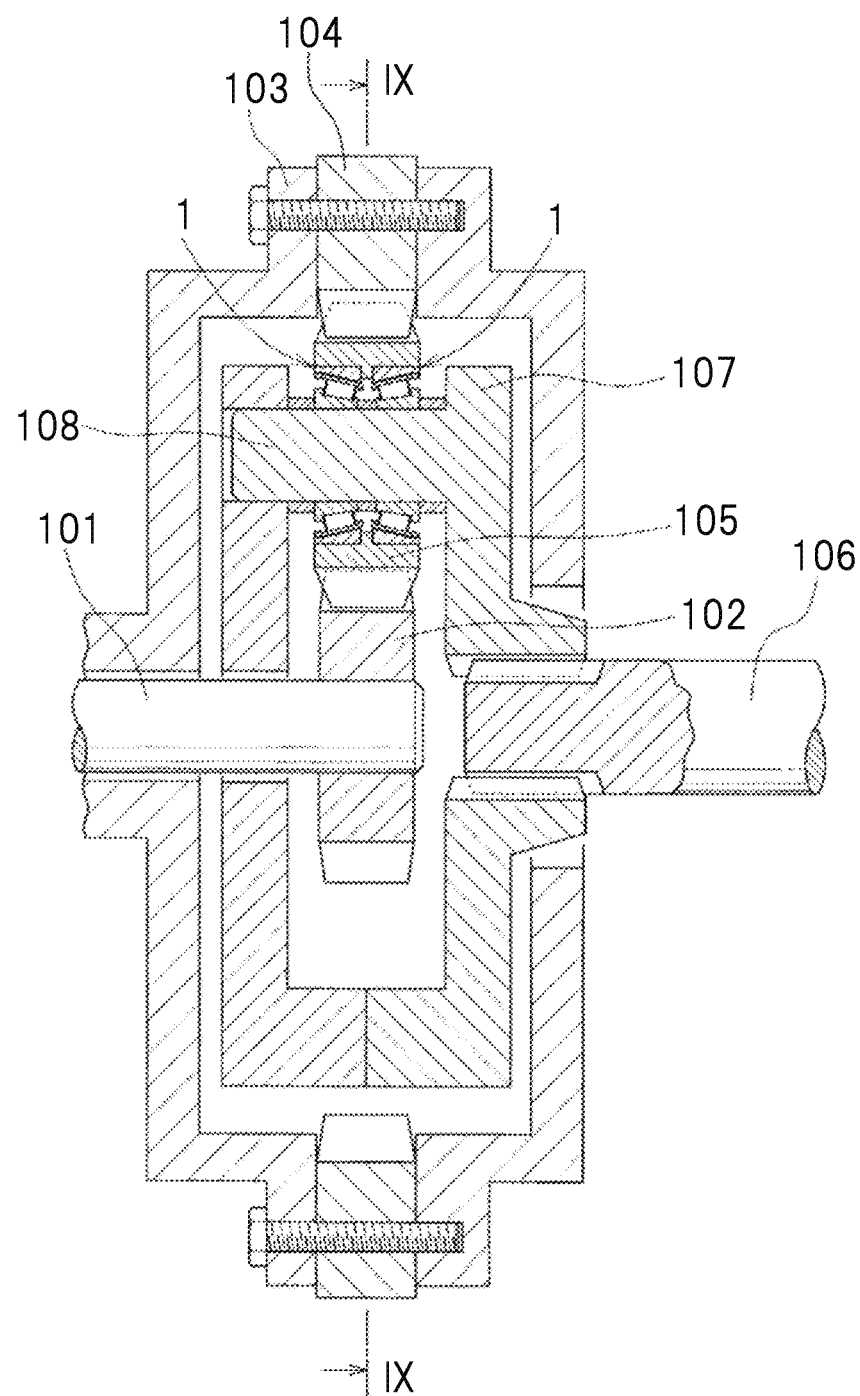
FIG. 8 shows a longitudinal section of an example planetary speed reducer in which the tapered roller bearing is used.
Figure 9:
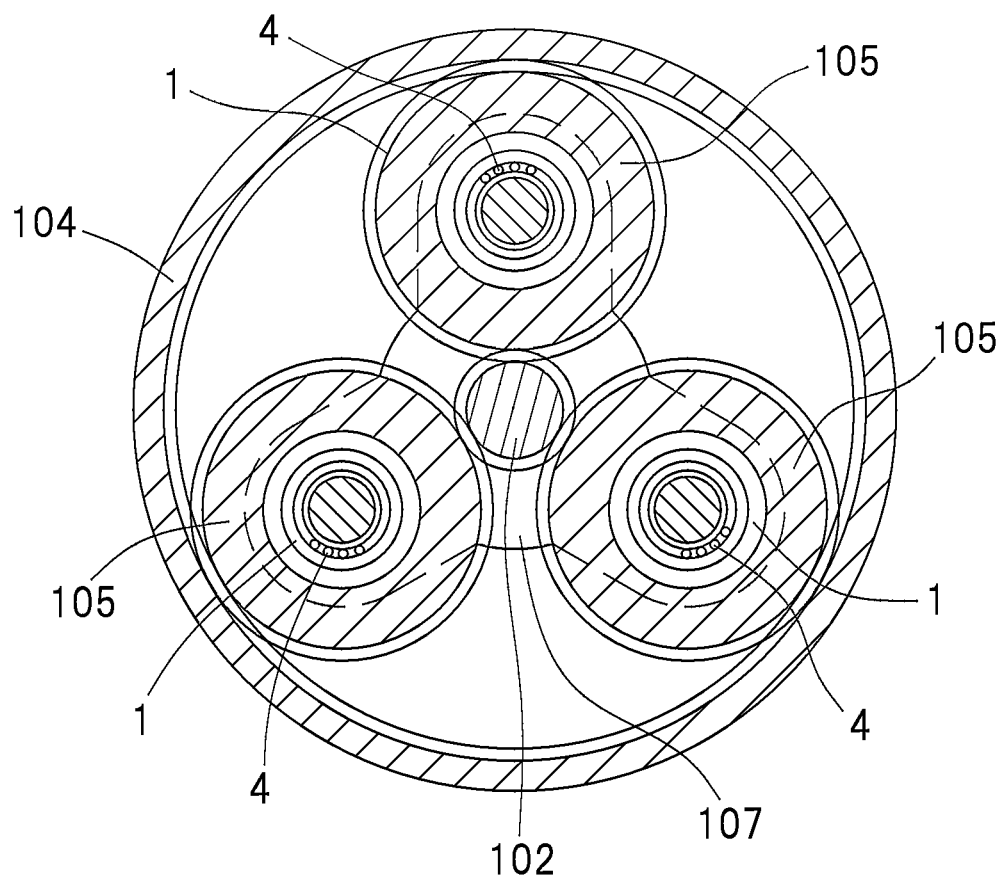
FIG. 9 shows a section taken along the line IX-IX in FIG. 8.

FIGS. 8 and 9 depict an example planetary speed reducer in which the tapered roller bearing 1 of the instant embodiment is used. The planetary speed reducer includes a plurality of planetary revolving elements 105 that are arranged between a sun gear 102 mounted on an input shaft 101 and an internal gear 104 secured to a housing 103, to serve as planetary gears that meshingly engage with both of the gears 102, 104. Each of the planetary revolving elements 105 is rotatably supported on a carrier 107 that is coupled to an output shaft 106, such that, as the planetary revolving elements 105 rotate on their own axes between the sun gear 102 and the internal gear 104, a revolving motion is produced by the planetary revolving elements 105 and output to the output shaft 106 by being transmitted through the carrier 107. For example, the planetary speed reducer is responsible for the first-stage speed reduction of a final speed reduction device which is located inside a wheel rim of a construction machine.

A pair of the tapered roller bearings 1 are disposed between the carrier 107 and each of the planetary revolving elements 105 of the planetary speed reducer. The outer member 3 (FIG. 1) of each of the tapered roller bearings 1 is fitted to a corresponding planetary revolving element 105 to rotate as a unit with the same. The inner member 2 of each of the tapered roller bearings 1 is fixedly fitted to a corresponding one of support shafts 108 located on the carrier 107.

Figure 10A:
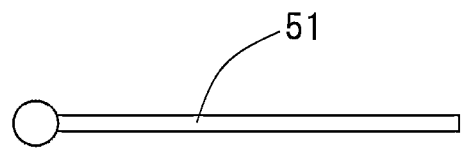
FIG. 10A shows a diagram that illustrates an example gauge used in clearance control for the tapered roller bearing.
Figure 10B:
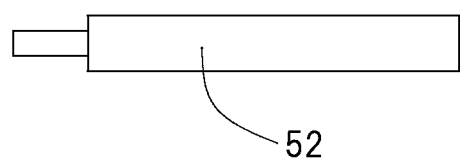
FIG. 10B shows a diagram that illustrates another example gauge used in clearance control for the tapered roller bearing.
Figure 11:
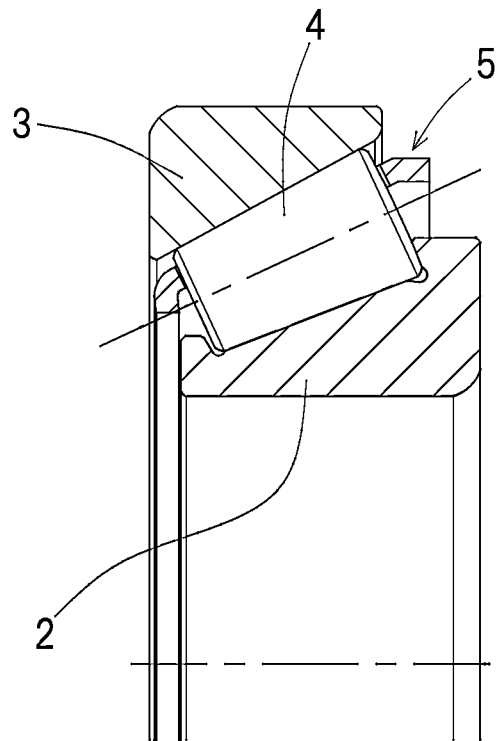
FIG. 11 shows a longitudinal section of a conventional tapered roller bearing of a rolling element guidance design.
Figure 12A:
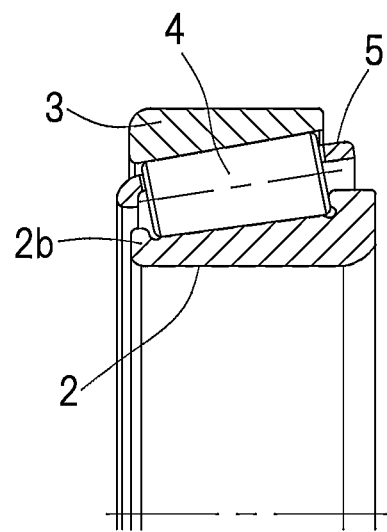
FIG. 12A shows a diagram that illustrates how a centrifugal force acts on a tapered roller bearing of a rolling element guidance design.
Figure 12B:
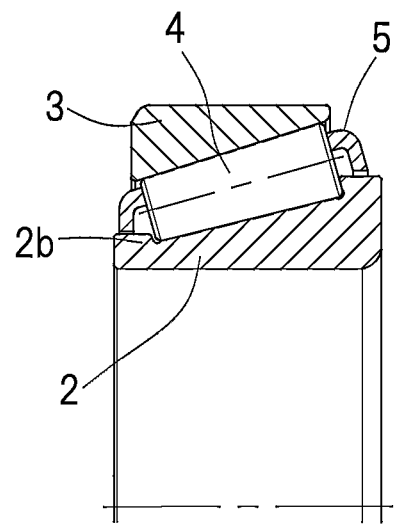
FIG. 12B shows a diagram that illustrates how a centrifugal force acts on a tapered roller bearing of an inner ring guidance design.
Figure 13A:
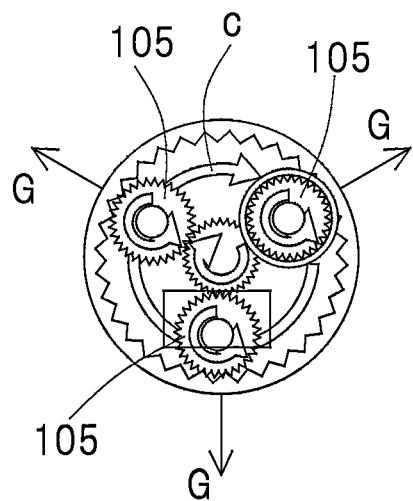
FIG. 13A shows another diagram that illustrates how a centrifugal force acts on a tapered roller bearing of a rolling element guidance design.
Figure 13B:
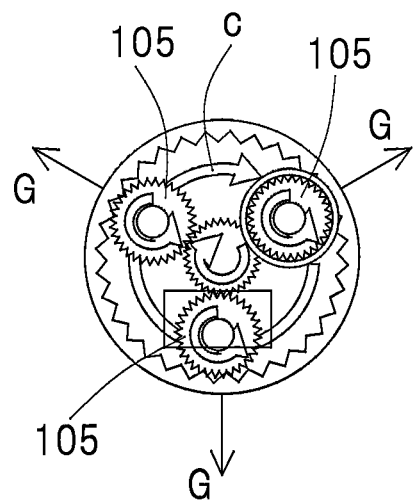
FIG. 13B shows another diagram that illustrates how a centrifugal force acts on a tapered roller bearing of an inner ring guidance design.
Figure 14A:
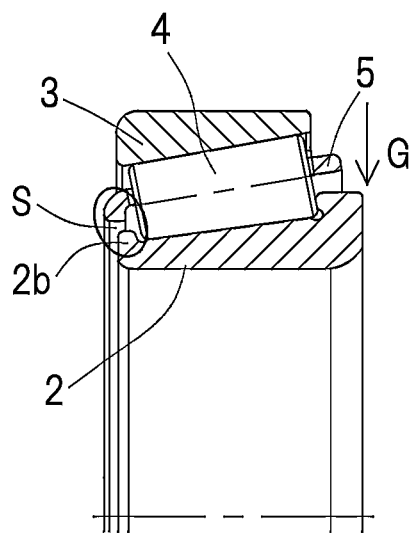
FIG. 14A shows yet another diagram that illustrates how a centrifugal force acts on a tapered roller bearing of a rolling element guidance design.
Figure 14B:
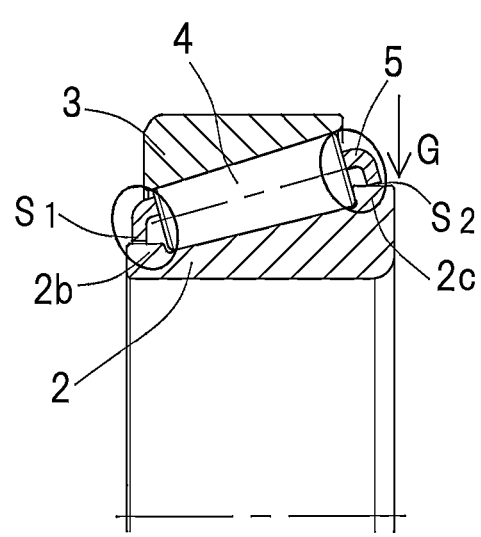
FIG. 14B shows yet another diagram that illustrates how a centrifugal force acts on a tapered roller bearing of an inner ring guidance design.
Figure 15A:
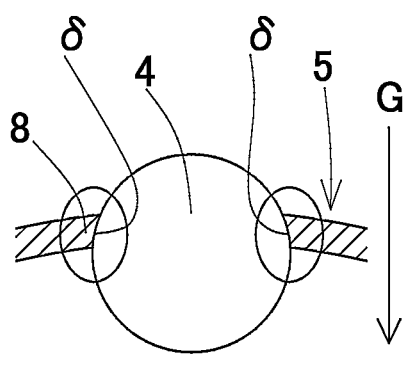
FIG. 15A shows yet another diagram that illustrates how a centrifugal force acts on a tapered roller bearing of a rolling element guidance design.
Figure 15B:
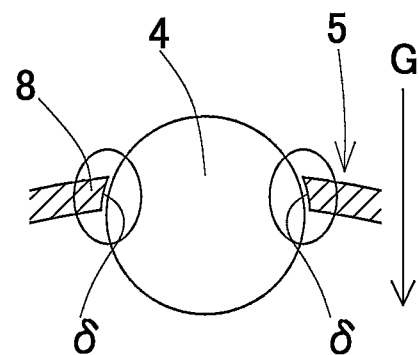
FIG. 15B shows yet another diagram that illustrates how a centrifugal force acts on a tapered roller bearing of an inner ring guidance design.

It should be pointed out that the smaller diameter-side clearance S₁ and the larger diameter-side clearance S₂ should be measured as necessary to check whether they are within appropriate ranges, because deviations could occur from factors like inadequate crimping of the smaller diameter annular part 6 of the cage 5 during assembly. By way of example, the procedure for appropriate measurement of the smaller diameter-side clearance S₁ involves, firstly, inserting a reference feeler gauge 51 shown in FIG. 10A such that its tip ball section (e.g., having a diameter set to the design value of S₁) is positioned between the smaller rib 2b of the inner ring 2 and the smaller diameter annular part 6 of the cage 5 at a given circumferential point (which is defined as an angular position of 0 degree), and measuring the smaller-side clearance S₁ at an angular position of 180 degrees that is radially opposite to the angular position of 0 degree with the use of one of measurement feeler gauges 52 (i.e., one from a plurality of gauges having a tip cylindrical section with slightly differing diameters) shown in FIG. 10B. This step is repeated by switching the angular position at which to insert the reference feeler gauge 51 and the angular position at which to apply the measurement feeler gauges 52. The values of the smaller-side clearance S₁ obtained from these measurements are averaged to calculate a reference clearance.

The procedure for appropriate measurement involves subsequently inserting the reference feeler gauge 51 such that the its tip ball section is positioned between the smaller rib 2b of the inner ring 2 and the smaller diameter annular part 6 of the cage 5 at a given circumferential point (which is defined as an angular position of 0 degree) to reproduce the reference clearance at the angular position of 180 degrees, and measuring the smaller-side clearance S₁ at the angular position of 180 degrees with the use of the measurement feller gauges 52 to see if the smaller-side clearance S₁ is staying within a selected appropriate range from the reference clearance. A similar procedure can be taken for appropriate measurement of the larger diameter-side clearance S₂ to see whether it is staying within an appropriate range.

While preferred embodiments have been described thus far with reference to the drawings, a person skilled in the art who read the instant specification would readily conceive of various changes and modifications within the range of obviousness. Accordingly, such changes and modifications are construed to fall within the scope of the present invention as delimited by the appended claims.

REFERENCE NUMERALS

1 . . . tapered roller bearing
2 . . . inner ring
2a . . . raceway surface
2b . . . smaller rib
2c . . . larger rib
3 . . . outer member
3a . . . raceway surface
4 . . . tapered roller
5 . . . cage
6 . . . smaller diameter annular part
6a . . . flanged section
6b . . . corner section
7 . . . larger diameter annular part
7a . . . flanged section
7b . . . corner section
8 . . . pillar
9 . . . pocket
10, 11 . . . lubricant passage
b1 . . . radius of curvature of inner diameter surface of corner section
d . . . mean roller diameter
D . . . cage inner diameter
E₁ . . . smaller rib-side inner ring raceway diameter
E₂ . . . larger rib-side inner ring raceway diameter
E₃ . . . inner ring raceway diameter
l . . . roller length
O . . . axis of bearing
PCD . . . diameter of roller centers
S₁ . . . smaller diameter-side clearance
S₂ . . . larger diameter-side clearance
W . . . pocket width
X . . . dimensionless number
Y . . . dimensionless number
α . . . outer member angle
β . . . bending angle
θ . . . pillar angle

What is claimed is:

1. A tapered roller bearing of an inner ring guidance design comprising:
   an inner ring having a raceway surface and having opposite ribs including a smaller rib and a larger rib;
   an outer member having an annular raceway surface in opposition to the raceway surface of the inner ring;
   a plurality of tapered rollers interposed between the inner ring and the outer member; and
   a cage retaining the plurality of tapered rollers, the cage including a smaller diameter annular part, a larger diameter annular part, and pillars connecting the smaller diameter annular part and the larger diameter annular part at more than one circumferential location, the pillars being adjacent to each other to define, therebetween, pockets in which the tapered rollers are retained, the smaller diameter annular part and the smaller rib of the inner ring defining a smaller diameter-side clearance S₁ therebetween, the larger diameter annular part and the larger rib of the inner ring defining a larger diameter-side clearance S₂ therebetween, and the tapered roller bearing defining a dimensionless number Y which is in the range of at least 0.39 to no more than 0.88 according to the following equation (1):

$$Y = (S_{max}/S_3) \times (d/l) \tag{1}$$

where d is a mean roller diameter, l is a roller length, S₃ corresponds to the equation: $S_3=(W/2)/\tan\theta-(PCD/2+(d/2)/\sin\theta-((D/2)^2-(W/2)^2)^{1/2})$, $S_{max}$ is chosen from the maximum values of S₁ and S₂, W is a pocket width representing a width of a pocket at a location that corresponds to the mean roller diameter d, θ is a pillar angle which is a half of an angle formed, in a section corresponding to the mean roller diameter d, by surfaces of adjacent pillars that make contact with a tapered roller located in between, PCD is a diameter of roller centers representing a pitch circle diameter of an arrangement of the tapered rollers, and D is a cage inner diameter representing an inner diameter of the cage.

2. The tapered roller bearing as claimed in claim 1, wherein the smaller diameter annular part and the larger diameter annular part include an arcuate-shaped corner section from the pillars and a flanged section extending radially inwards from the corner section.

3. The tapered roller bearing as claimed in claim 2, wherein the flanged section of the larger diameter annular part and the pillars form a bending angle therebetween in the range of 90±10 degrees, as measured by using, as a reference angle, an angle of the cage defined by the pillars extending oblique to an axis of the bearing.

4. The tapered roller bearing as claimed in claim 2, wherein the corner section adjoining the flanged section in the larger diameter annular part has an inner diameter surface with a radius of curvature, which is more than 20% and less than 90% of a length of the larger diameter annular part as measured in a direction of extension of the pillars.

5. The tapered roller bearing as claimed in claim 2, wherein the flanged section has an inner periphery which is provided, at more than one location, with a lubricant passage resembling a cutout and permitting a lubricant to pass through the flanged section inwards and outwards in an axial direction of the bearing.

6. The tapered roller bearing as claimed in claim 1, wherein the cage comprises a press-formed or turned article.

7. The tapered roller bearing as claimed in claim 1, wherein the tapered roller bearing defines a dimensionless number X which is in the range of at least 0.69 to no more than 1.12 according to the following equation (2):

$$X = (1/\tan\alpha) \times \left(1 - (S_1/S_2) \times (d/1)\right) \quad (2)$$

where $S_1$ is the smaller diameter-side clearance, $S_2$ is the larger diameter-side clearance, d is the mean roller diameter, l is the roller length, and $\alpha$ is an outer member angle which is an angle formed by two generatrix lines of a truncated cone defined by the raceway surface of the outer member in a section containing an axis of the truncated cone and has a value in the range of at least 20 degrees to no more than 40 degrees.

8. The tapered roller bearing as claimed in claim 1, wherein a ratio of a sectional area of the larger diameter annular part to a sectional area of the smaller diameter annular part as measured in a longitudinal section is more than 1.0 and less than 1.2.

* * * * *